United States Patent [19]
Misawa et al.

[11] 3,746,438
[45] July 17, 1973

[54] CINE-CAMERA WITH SIMULTANEOUS OPTICAL SOUND-RECORDING DEVICE

[75] Inventors: Matsushi Misawa, Yokohama; Isao Kato, Yamato; Yasutake Kato, Tokyo, all of Japan

[73] Assignee: Kabushiki Kaisha Kohka, Tokyo, Japan

[22] Filed: Aug. 30, 1971

[21] Appl. No.: 176,061

[30] Foreign Application Priority Data

| Sept. 4, 1970 | Japan | 45/77160 |
| Dec. 17, 1970 | Japan | 45/112410 |
| Dec. 17, 1970 | Japan | 45/125867 |
| Dec. 28, 1970 | Japan | 45/119384 |
| Dec. 28, 1970 | Japan | 45/132135 |
| Dec. 28, 1970 | Japan | 45/132136 |

[52] U.S. Cl. ............ 352/166, 352/14, 352/29, 352/159
[51] Int. Cl. ............................. G03b 1/58
[58] Field of Search ............ 352/14, 159, 29, 352/166; 179/100.2 E, 100.2 F, 100.2 N, 100.2 Z

[56] References Cited
UNITED STATES PATENTS

| 3,597,056 | 8/1971 | Sasaki | 352/14 |
| 3,200,408 | 8/1965 | Nordin | 352/14 |
| 3,545,850 | 12/1970 | Hara | 352/159 X |
| 1,774,382 | 8/1930 | Kellogg | 179/100.3 |
| 2,193,665 | 3/1940 | Balsley | 179/100.3 |
| 2,036,622 | 4/1936 | Emmerich | 179/100.3 X |
| 2,527,454 | 10/1950 | Sachtlebeen et al. | 179/100.3 |
| 3,352,975 | 11/1967 | Floden | 179/100.3 X |

Primary Examiner—Samuel S. Matthews
Assistant Examiner—Michael L. Gellner
Attorney—E. F. Wenderoth et al.

[57] ABSTRACT

In a compact cine-camera with a simultaneous optical sound-recording device, there are provided means for producing a loop locally in the length of a motion picture film and for maintaining the loop at a constant length; means for stabilizing the travel speed of that portion of the loop of film that has passed the film exposing means; an optical sound-recording head with a luminescent diode facing the said stabilizer; and an amplifier means for altering the intensity of the luminance of the diode in accordance with the intensity of the signal of sound to be recorded. The luminant outputs of the diode are projected onto the film strips as they pass the stabilizer to form a sound track on the film. Thus, optical sound-recording is effected on the film simultaneously with the exposure of the film by a compact cine-camera having a simple structure which can be manufactured in a large number at a low cost without requiring any additional complicated equipment.

7 Claims, 17 Drawing Figures

PATENTED JUL 17 1973 3,746,438

MATSUSHI MISAWA,
ISAO KATO and
YASUTAKE KATO,
INVENTORS

BY Wenderoth, Lind & Ponack
ATTORNEYS

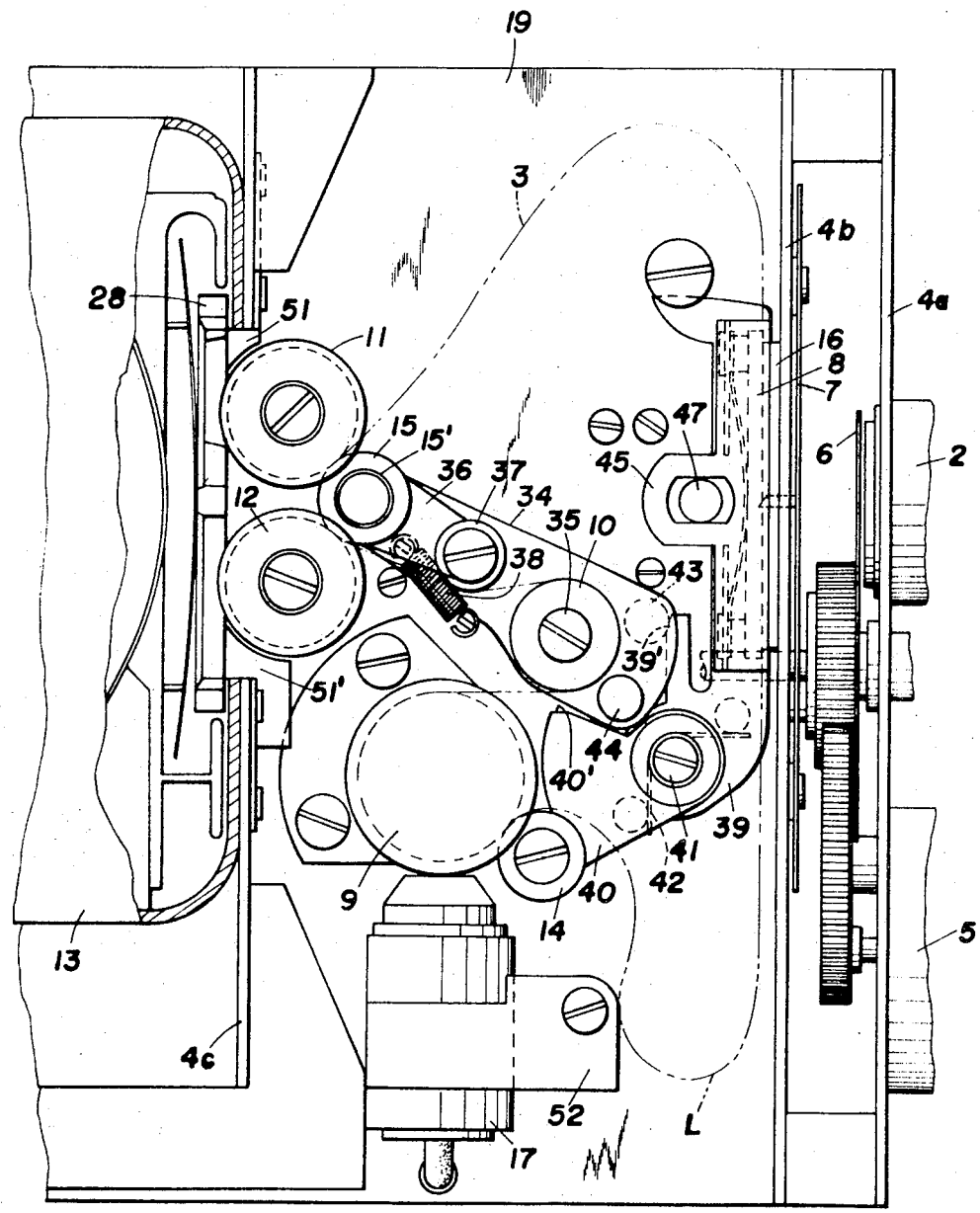

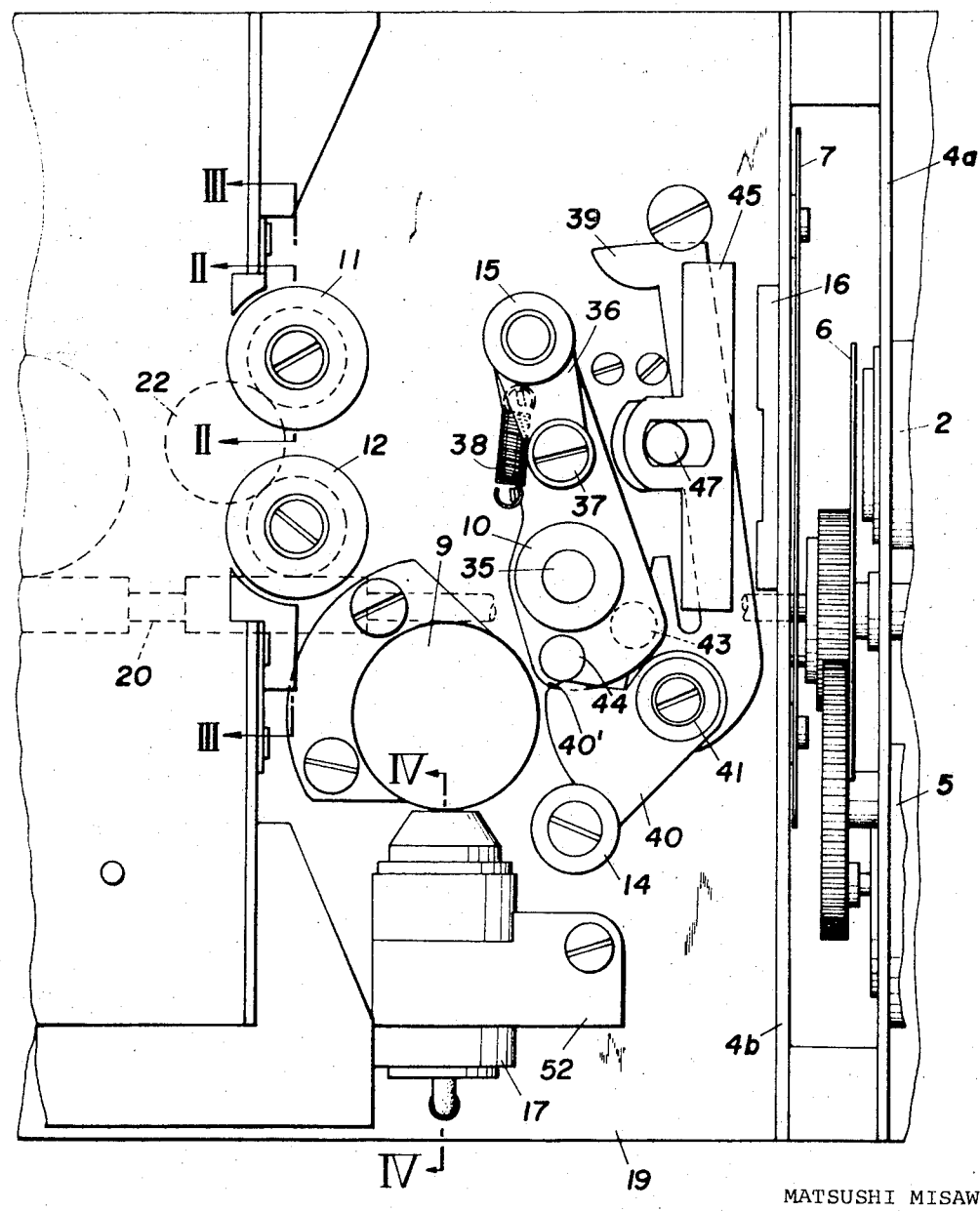

MATSUSHI MISAWA,
ISAO KATO and
YASUTAKE KATO,

INVENTORS

BY Wenderoth, Lind & Ponack

ATTORNEYS

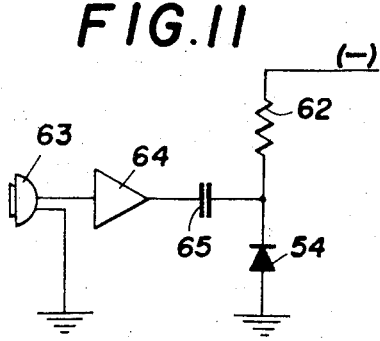
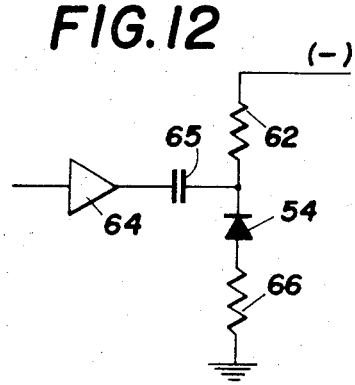
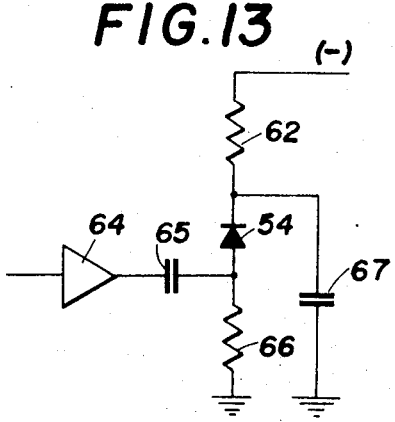
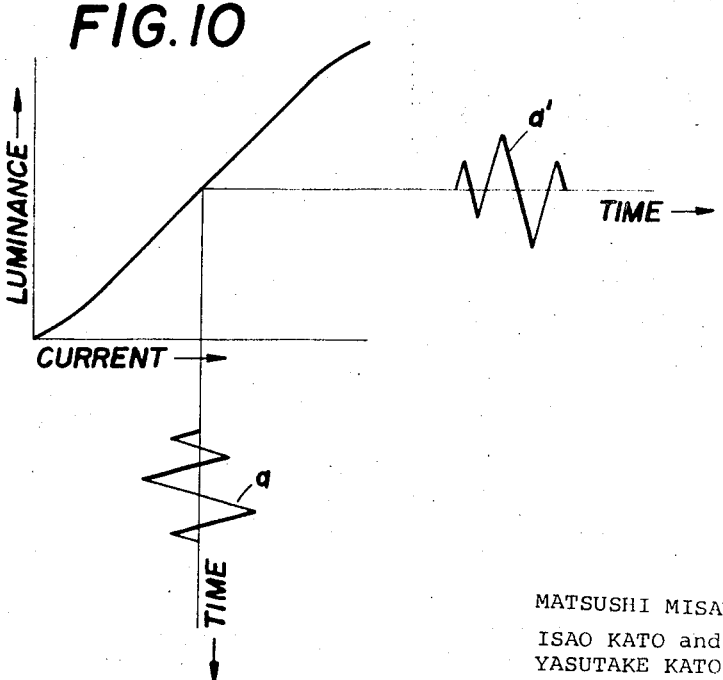

MATSUSHI MISAWA,
ISAO KATO and
YASUTAKE KATO,

INVENTORS

CINE-CAMERA WITH SIMULTANEOUS OPTICAL SOUND-RECORDING DEVICE

BACKGROUND OF THE INVENTION

1. Field of the Invention

The present invention is concerned with a cine-camera, and more particularly, it relates to a compact cine-camera intended for non-professional users, which enables sounds to be optically recorded simultaneously with the exposure of motion picture film.

2. Description of the Prior Art

It is usual in known cine-cameras designed for professional use that sounds are optically recorded at the same time with the exposure of the film. These known cine-cameras of the professional type are of a large size and are complicated in structure with such component members as exciter lamp, galvanometer and mirror. Thus, the cine-cameras of the professional type are not applicable to compact cine-camera for non-professional users which are characterized by portability and easy operability.

Also known is a compact cine-camera for non-professional purposes, which is provided with a synchronizer for a tape recorder and which, accordingly, is capable of performing the recording of sound simultaneously with the exposure of the film. However, this type of cine-camera of the prior art requires a separate tape recorder to be carried along with the camera. It further requires that the projection of the images carried on the film be synchronized with the tape recorder. Thus, cine-cameras of this type require a considerably advanced and well trained technique, and thus, they are not used widely among non-professional people other than those few who are colloquially called "manias".

SUMMARY OF THE INVENTION

It is, therefore, an object of the present invention to provide an improved compact cine-camera having a simultaneous optical sound-recording device, which is capable of performing the recording of sound simultaneously with the exposure of film and which can be operated easily by any non-professional user.

Another object of the present invention is to provide an improved compact cine-camera of the type described, which has necessary minimum operating mechanism housed in a compact casing and yet insures that the two kinds of functions, i.e., the intermittent feed of film for exposure purpose and the constant feed of film for recording purpose, are accomplished perfectly without adversely affecting each other at all, and which permits the loading of film quite easily.

Still another object of the present invention is to provide an improved compact cine-camera of the type described, which allows the use of a motion picture film packed in a cartridge.

A yet another object of the present invention is to provide an improved compact cine-camera of the type described, which is capable of performing a high fidelity optical sound recording, with such a frequency band for recording of sound as is sufficient also for the reproduction of the sound recorded.

A further object of the present invention is to provide an improved compact cine-camera having the type and features described above, which is simple in structure and can be manufactured in a large number at a low cost.

A still further object of the present invention is to provide an improved compact cine-camera which requires no additional complicated equipment and accordingly can be operated easily.

These and other objects as well as the features and advantages of the present invention will become apparent by reading the following detailed statement when taken in conjunction with the accompanying drawings.

BRIEF DESCRIPTION OF THE DRAWINGS

The drawings show preferred embodiments of the present invention. It should be understood that like parts are indicated by like reference numerals throughout the specification and drawings.

FIG. 3 is a side elevation, on an enlarged scale, showing the essential mechanism of the cine-camera of FIG. 2.

FIG. 4 is a side elevation, on an enlarged scale, showing the similar region of the mechanism but the parts thereof being in a state different from that of FIG. 3.

FIG. 10 is a chart of an input current and the luminance of a luminescent diode to explain the relationship between the set position of the sound-recording bias, the signal and the current generated.

FIG. 11 is a diagrammatic explanatory illustration, showing the construction of a drive circuit for the luminescent diode.

FIG. 12 and 13 are diagrammatic explanatory representations, showing the constructions of drive circuits of other preferred types for a luminescent diode.

DETAILED DESCRIPTION OF THE PREFERRED EMBODIMENTS

The compact cine-camera having an optical sound-recording device shown in the embodiments is designed to use an 8 mm film cartridge (trade name: KODAK SUPER 8) produced by Eastman Kodak Co., Ltd. of U.S.A.

Figure 1:
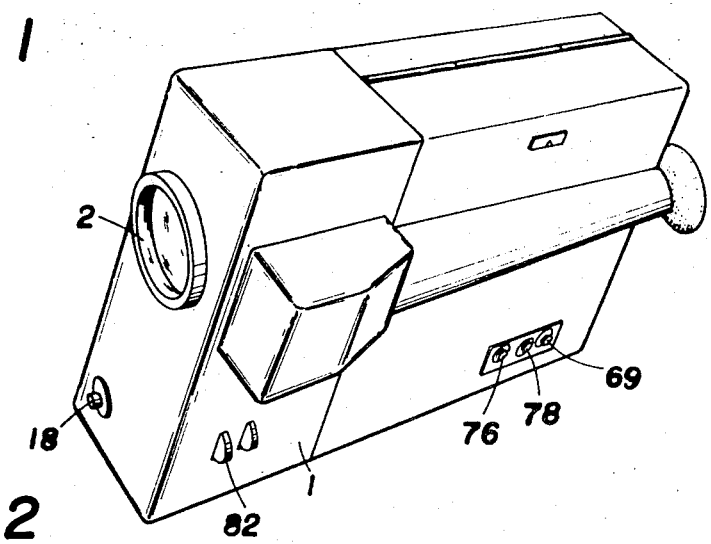
FIG. 1 is a perspective view, showing the external appearance of the cine-camera embodying the prsent invention.
Figure 2:
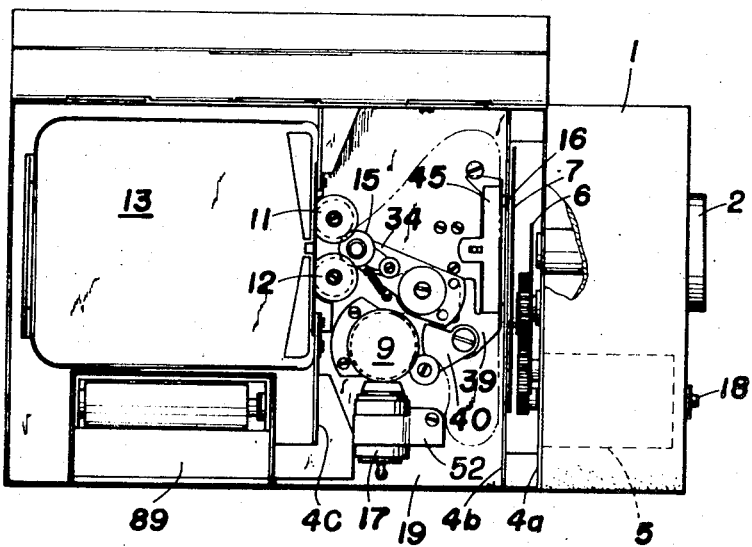
FIG. 2 is a side elevation, with the side cover panel removed, to show the cine-camera as viewed on the opposite side of that of FIG. 1.

Referring now to FIG. 1, there is shown a perspective view of the cine-camera of the present invention. In the drawings, reference numeral 1 represents a casing of the cine-camera of the present invention for housing the film cartridge as well as the film feeding, the film exposing and the optical soundrecording mechanisms therein. A camera lens system 2 is provided in the foreground of this casing 1. The lens system 2 is supported by both a partition wall 4a and the casing 1. An exposure aperture for the film 3 is formed in a partition wall 4b which is provided within the casing 1 in parallel relationship with the said partition wall 4a. In the space between these two partition walls 4a and 4b, there are provided a sector vane 6 which is driven from a micromotor 5 via a train of gears, and also a slidable plate 7 having a film feeding pawl. This slidable plate 7 is adapted to make reciprocating movement by a cam secured to the rotatable shaft of the sector vane 6 to intermittently feed the film 3, one strip after another. The aforesaid exposure aperture opens through the partition wall 4a and also through a guide rail 16 which, in turn, is fixed to this partition wall 4a. The film 3 is adapted to be pinched between a pressing plate 8 which is positioned immediately behind the said aperture and the said guide rail 16, so as to be positioned at the focal point of the lens system 2. The foregoing arrangement is similar to that of known compact cine-cameras.

In the casing 1, there is provided, on the base plate 19, still another partition wall 4c in parallel relationship with the aforesaid two partition walls 4a and 4b. On the base plate 19 between these partition walls 4b and 4c, there is provided a film feeding mechanism for effecting a circulatory travel of the film 3 starting from a cartridge 13 and returning thereinto.

The film feeding means comprises a film out-drawing sprocket 11 and a film taking-in sprocket 12. These two sprockets 11 and 12 are rotatably supported on a plate 19' which, in turn, is fixed to the base plate 19 of the casing 1. These two sprockets 11 and 12 are rotated by the motor 5 together with the exposure means in synchronism therewith and in such a way that the length of the loop formed of the film 3 is maintained constant. More specifically, the sprocket 12 is arranged to be driven by a worm and a worm wheel from a rotatable shaft 20 to which the sector vane 6 is fixed. On the other hand, an idler gear 22 which meshes with the worm wheel of the sprocket 12 drives the gear of the sprocket 11.

Of these two sprockets 11 and 12, the film out-drawing sprocket 11 is provided with a unidirectionally driven clutch to facilitate the film out-drawing operation in which the film 3 is led from the cartridge 13. The film out-drawing sprocket 11 is structured so that its sprocket wheel 11' is rotatably mounted on a pin 23 which, in turn, is fixed to the base plate 19. An engaging projection 24 is formed at one end of this sprocket wheel 11'. A sleeve 25 is rotatably mounted on this pin 23. On the said sleeve 25 are mounted a sort of dog clutch means comprising two cylindrical clutch members 27 and 30. More specifically, these two clutch members 27 and 30 are provided with saw-tooth like pawls 26 and 26', respectively, which are adapted to mesh with each other. On the opposite side of the clutch member 27 relative to that side having the pawl 26, teeth are provided which mesh with the said counter gear 22. Also, on the opposite side relative to that side having the pawl 26' of the other clutch member 30, a groove 29 is provided for receiving the said engaging projection 24. The position of one end of the sleeve 25 is limited by a stopper 31. The other end of this sleeve 25 is provided with a flange 32 which is formed integrally therewith. A coil spring 33 is applied between this flange 32 and the clutch member 30. This coil spring 33 serves, normally, to urge the said cylindrical clutch member 30 towards the toothed wheel 27 to constitute a unidirectionally driven clutch means.

The aforesaid means for maintaining the length of the loop of film 3 constant may be accomplished alternatively by an arrangement comprising two pairs of capstan rollers and pinching rollers, with one capstan roller and one pinching roller forming a pair. In the said arrangement, it should be understood that the two capstan rollers are rotated at a constant speed from the motor 5 in synchronism with the driving of the exposure means and the film reels. Desirably, the pinching rollers are arranged so that they move away from their mating capstan rollers, respectively, upon suspension of the feeding of the film 3, in order to prevent the pinching rollers from becoming deformed.

A control lever 34 is provided so that it can be rotated about a pin 35 which, in turn, is fixed to the base plate 19. A film guide roller 15 is rotatably mounted onto one end of this control lever 34. In the tilted state of the control lever 34 as shown in FIG. 3, the guide roller 15 is positioned quite close to both of the sprockets 11 and 12 simultaneously, leaving a small space therebetween which is sufficient for allowing the film 3 to pass through this space between these sprockets 11 and 12 and the guide roller 15, so as to guide the film towards these two sprockets and to prevent the film from travelling in the reverse directions relative to the respective sprockets.

A knob 15' is provided on this pressing roller 15 concentrically therewith to facilitate the rotation of the control lever 34. A lever 36 is rotatably mounted at one end on the rotatable shaft of the aforesaid direction limiting roller 15. A tension roller 37 is rotatably attached to the other end of this lever 36. A coil spring 38 is applied between this lever 36 and the control lever 34. The lever 36 is urged by the said coil spring 38 to rotate clockwise about the shaft of the pressing roller 15. A guide roller 10 is rotatably mounted on a pin 35 in such a way that the guide roller 10 is superposed on one side of the control lever 34. Two levers 39 and 40 are fixed at one end to a pin 41 which is supported on the base plate 19. The other end portion of lever 39 is engaged by a holder 45 having a film pressing plate, via a pin 47. Also, on the other end of the other lever 40 is rotatably supported a capstan roller 14. On the reverse side of these respective two levers 39 and 40 are provided pins, respectively, which are adapted to be engaged by the opposite ends, respectively, of a helical spring 42 which is mounted on the pin 41. By this arrangement, the lever 39 is normally is urged to rotate counter-clockwise, whereas the lever 40 is urged to rotate clockwise. These two levers 39 and 40 are provided further with work faces 39' and 40', respectively, which are adapted to be engaged by pins 43 and 44, respectively, of the control lever 34. In the state of this control lever 34 in which it is rotated up to the farthest counter-clockwise position as shown in FIG. 3, or in the first position of the control lever 34, the pin 43 of the control lever 34 is in engagement with the work face 39' of the lever 39 to rotate the latter 39 clockwise. Also, in the state of the control lever 34 in which it is rotated clockwise as shown in FIG. 4, or in the second position of the control lever 34, the pin 44 of this control lever 34 is in engagement with the work face 40' of the lever 40 to coercively rotate this lever 40 counter-clockwise. In each of these first and second positions of the control lever 34, it should be understood that when either one of the pins engages the work face of its corresponding lever, the other of the pins is unfailingly disengaged from the work face of its corresponding lever. Accordingly, in the said first position of the control lever 34, the lever 40 is urged by the helical spring 42 to rotate clockwise, whereas in the said second position of the control lever 34, the lever 39 is urged by the helical spring 42 to rotate counter-clockwise.

The film pressing plate 8 is supported within the holder 45. More specifically, this film pressing plate 8 is supported on the holder 45 so as to move back and forth by pins relative to the partition wall 4b. This film pressing plate 8 is also urged against the guide rail 16 by a leaf spring. By moving the said holder 45 forwardly, or in other words, towards the right side in the drawings, the film 3 is urged to be placed just onto the position of the focal point of the lens system 2 while being in contact with the guide rail 16. Also, by moving the holder 45 backwardly, there is produced a clearance or gap between the pressing plate 8 and the guide rail 16, and this gap facilitates the setting of the film 3. This holder 45 is mounted on the pin 47 which extends from the lever 39. Accordingly, as this lever 39 is rotated, the pressing plate 8 is caused to advance forwardly whenever the control lever 34 is in its first position. Also, whenever the control lever 34 is in its second position, the pressing plate 8 is caused to retreat from its advanced position as the lever 39 is rotated. In accordance with the forward and backward movements of the pressing plate 8, the capstan roller 14 of the lever 40 is brought into pressure contact with and is brought away from the film speed stabilizing roller 9. This film speed stabilizing roller 9 is supported on the base plate 19 via a bearing means. This film speed stabilzing roller 9 is given a sufficient mass of inertia by a fly wheel which is secured to one end of the rotatable shaft of the stabilizing roller 9. This arrangement permits that particular portion of the film 3 which passes this stabilizing roller 9 to travel smoothly at a constant speed in spite of the intermittent feeding of the strips of film 3 at the film exposure section of the camera.

Description will hereunder be directed to the manner in which the film 3 is loaded on the cine-camera of the present invention having the foregoing arrangement.

In order to load a motion picture film 3 on the camera, the knob 15' of the film guide roller 15 is turned manually by the operator to rotate the control lever 34 clockwise to set this control lever 34 in its first position. Whereupon, the pin 44 of this control lever 34 is brought into contact with the work face 40' of the lever 40 so that this lever 40 is rotated counter-clockwise. As a result, the capstan roller 14 is caused to move away from the film speed stabilizing roller 9. At the same time therewith, the contact between the pin 43 and the work face 39' of the pressing lever 39 is relieved. As a consequence, the lever 39 is caused to rotate counter-clockwise by the action of the helical spring 42. Accordingly, the holder 45 which is engaged by the lever 39 shifts its position backwardly in the direction away from the partition wall 4b, producing a gap between the pressing plate 8 and the guide rail 16. Now, a loop of the film 3 which is produced as a portion of the film is drawn out through the window 13' of the film cartridge 13 is passed around the two sprockets 11 and 12, and also is passed through the gap between the guide rail 16 and the pressing plate 8, and therefrom it is applied onto the film speed stabilizing roller 9 and to the guide roller 10, while forming a loop between the sprocket 11 and the pressing plate 8 and also forming a larger loop L in the length of the film located between the pressing plate 8 and the film speed stabilizing roller 9.

After the foregoing setting of the film 3 has been completed, the cartridge 13 is set in place within the housing which is formed on the base plate 19. Then, the knob 15' is manipulated to rotate the control lever 34 counter-clockwise, setting it to the second position. Whereupon, the film guide roller 15 moves closer to the sprocket 11 and 12 to guide the film thereto. With this movement of the roller 15, the pin 44 which is provided on the control lever 34 is caused to move away from the work face 40' of the lever 40 in the manner as shown in FIG. 3. As a result, the lever 40 is caused to rotate clockwise by the action of the helical spring 42, and the capstan roller 14 urges the film 3 against the film speed stabilizing roller 9. At the same time therewith, the pin 43 of the control lever 34 pushes the work face 39' of the lever 39 to rotate this lever 39 clockwise. Accordingly, the holder 45 is shifted in its position, so that the pressing plate 8 urges the film 3 towards the guide rail 16 to place this film 3 at the focal position of the lens system 2. Also, as the control lever 34 is rotated as stated above, the tension roller 37 applies a predetermined amount of tension to the travelling film 3. Then, by closing the side cover panel of the casing 1, the cine-camera is rendered ready for both exposure and optical sound-recording operations.

Let us now assume that the exposure button 18 is depressed. Whereupon, the motor 5 is driven, so that the movable members, i.e., the sector vane 6, the slidable plate 7 having a film feeding pawl, sprockets 11 and 12, and the reels of the cartridge 13, are driven, respectively. Whereupon, the film 3 is fed continuously from the cartridge by the sprocket 11 and also, the forward end of the travelling film 3 is taken in by the sprocket 12 onto the take-up reel of the cartridge 13. The film speed stabilizing roller 9 is rotated as the film 3 is taken-in by the sprocket 12. During this course of travel of the film 3, the pulsating mode of travel of the film 3 which is caused by the sprocket 12, and the intermittent mode of feeding of the film 3 caused by the film exposure means are both absorbed by the film speed stabilizing roller 9 in cooperation with the loop L of the film 3. Thus, that portion of the film 3 which is located on this stabilizing roller 9 is fed at a smooth, constant speed. The film 3 is exposed to light coming from the object to be photographed at such a time as this film 3 passes between the guide rail 16 and the pressing plate. When the film 3 is located on the film speed stabilizing roller 9, an optical sound-recording is effected onto this part of the film by the optical sound-recording head 17.

Upon removal of the pressure from the exposure button 18 of the camera, the motor 5 is brought to a halt, and the abovestated actions of the respective parts of the camera cease, so that both the exposure and the optital sound-recording are suspended simultaneously.

After the completion of both the exposure and the optical sound-recording of one reel-full of film contained in the cartridge 13, the side cover panel of the casing 1 is opened and the knob 15' is manually operated to set the control lever 34 to the first position. Whereupon, the respective parts of the camera are rendered uncocked so that the film may be removed easily from these parts. Therefore, the film is taken off these parts. Then, the cartridge is taken out from the casing 1. With this, one entire course of operation of the cine-camera is completed.

Figure 6:
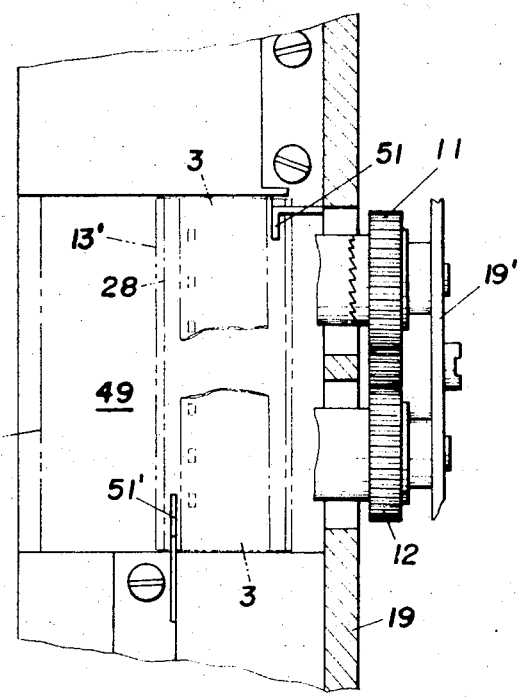
FIG. 6 is a side elevation, showing the open region intended for drawing out and taking in the film, taken along the line III—III in FIG. 4.

In order to facilitate the drawing-out of the film from the cartridge 13 at the time of loading the film on the cine-camera, and to prevent the film from sustaining any injury during the loop-producing step at the time of loading the film on the camera, there is provided means for releasing the film pressing plate of the cartridge case 13. More specifically, there is provided — in substantially the central portion of the partition wall 4c as shown in FIGS. 3 and 6 — an opening 49 having a dimension substantially equal to that of the window 13' of the cartridge 13. The cartridge-loading chamber in the casing 1 is designed so that, at the time the cartridge is loaded, the opening 49 of the partition wall 4c is aligned with the window 13' of the cartridge 13. Furthermore, push-pawls 51 and 51' are secured to the upper and the lower edges of the opening 49 of the partition wall 4c. These push-pawls 51 and 51' are provided at positions outside the path of travel of the film 3, and they protrude into the window 13' of the cartridge 13. It will be understood that, because of this arrangement, when the cartridge 13 is loaded on the cartridge chamber formed in the casing 1, the aforesaid two push-pawls 51 and 51' intrude into the window 13' of the cartridge 13 and push — towards the interior of the cartridge 13 — the film pressing plate 28 which is provided within the cartridge 13 and which has till then been pressed against the inner face of the wall of the cartridge casing by a spring leaving no gap between the pressing plate 28 and this wall of the cartridge, and thus a gap is produced between this film pressing plate 28 and the case of the cartridge 13. Accordingly, this gap makes the drawing-out of the film 3 to be performed easily, and prevents the film from becoming injured as it drawn out from the cartridge.

Figure 7:
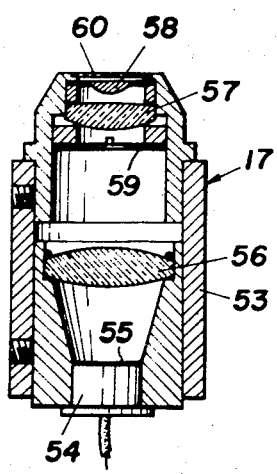
FIG. 7 is a longitudinal sectional view, on an enlarged scale, of an optical sound-recording head, taken along the line IV—IV in FIG. 4.

The optical sound-recording head 17 is arranged at a position which is 18 film-strips ahead of the exposure aperture according to the international standard, and is supported by a holder 52 which, in turn, is screwed to the base plate 19. This optical sound-recording head 17 is arranged so that its foremost end is directed to face the film speed stabilizing roller 9 precisely so that the beam of light from the head 17 will be focused exactly onto the film strip located on the film speed stabilizing roller 9. In FIG. 7, the head 17 has a casing 53 which is cylindrical in configuration. A luminescent diode 54 is fixed to one end of this cylindrical casing 53 in such a way that the center of the luminescent plane of the diode 54 faces exactly the central axis of the film speed stabilizing roller 9. A first mask 55 having a sufficiently narrow slit is provided in the immediate foreground of the luminescent diode 54 so as to abut the luminescent plane of the diode 54. A light-focusing lens system which is formed with a condenser lens 56, a relay lens 57 and a cylindrical lens 58 is provided in the foregrouns of the mask 55. This lens system is arranged so that the image of the luminescent region of the diode 54 is focused exactly onto the film strip located on the film speed stabilizing roller 9. A diaphragm 59 is provided between the condenser lens 56 and the relay lens 57. This diaphragm 59 serves to limit the amount of light — incident to the film 3 — of the luminescent diode 54 in accordance with the sensitivity of the film used. Furthermore, a second mask 60 is provided in the foreground of the cylindrical lens 58. This second mask 60 has a rectangular slit to limit the longitudinal dimension of the said image of the luminescent region of the diode 54 which is focused onto the film strip 13.

Figure 8:
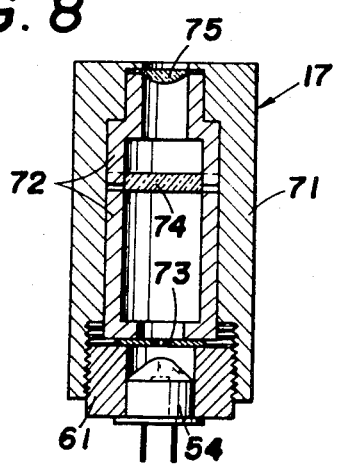
FIG. 8 is a similar view as that of FIG. 7, of another preferred type of optical sound-recording head.
Figure 5:
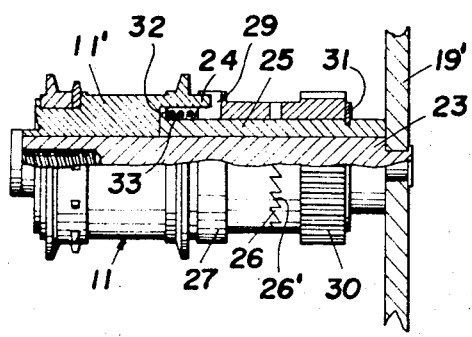
FIG. 5 is a side elevation, partly in section and on an enlarged scale, of the film drawing-out sprocket, taken along the line II—II in FIG. 4.

This arrangement of the optical sound-recording head 17 is suitable for such a diode 54 which is designed to effect linear luminescence. In case a diode which is designed for planar luminescence is used, it is desirable to enploy a head arrangement as shown in FIG. 8. In this latter instance shown in FIG. 8, the luminescent diode 54 is screwed, through a base 61, into a casing 71, and it is set in place therein by a sleeve 72 which is housed in the casing 71. A mask 73 having a sufficiently narrow slit is positioned between the diode 54 and the sleeve 72. This mask 73 is nipped by these members within the casing 71. The sleeve 72 comprises two parts. A cylindrical lens 74 is nipped between these two parts of the sleeve 72. This cylindrical lens 74 — in cooperation with another cylindrical lens 75 which is fixed to that end of the casing 71 located farther from the diode 54 — forms a condenser lens system capable of focusing, onto the film strip located exactly on the stabilizing roller 9, that image of the luminescent region of the diode which has passed through the mask. These lenses are of different radii and thicknesses, respectively, and are positioned so as to cross each other in such a way that the first cylindrical lens 74 serves to limit the longitudinal dimension of the aforesaid image of light, whereas the second cylindrical lens 75 serves to limit the breadth of this image.

The luminescent diodes 54 which are used in these embodiments are SL 101 (trade name, a product of Nippon Electric Co., Ltd. of Japan) and ME 112 (trade name, a product of Mitsubishi Electric Corporation of Japan).

In general, the voltage-current characteristic of a luminescent diode is altogether the same with that of other diodes. On the other hand, a luminescent diode is, in general, of a linear current-luminance characteristic except for the portion where the input current is very small and for the portion where the input current is very large, as shown in FIG. 10. As a result of experiment conducted by the inventors, it has been ascertained that, by setting the value of the biasing current at the center of the aforesaid linear portion and by superposing a sound signal current thereto, the luminance of the luminescent diode alters as shown by Curve $a'$ in proportion to the changes indicated by Curve $a$ in the value of the input current of a sound signal. In other words, it has been ascertained by the inventors that the luminance of the diode can be altered in proportion to the pressure or cycle of the sound applied onto the microphone.

Some examples of circuit for driving the luminescent diode serving as such a transducer as stated above are shown in FIGS. 11 through 13. In FIG. 11, it will be noted that a load resistor 62 is connected in series to the luminescent diode 54, and that a constant DC current is adapted to be supplied, normally, to this diode. This biasing current is of a value which is preferably set at 1/2 of the range of the amount of current in the linear portion of the current-luminance characteristic of the luminescent diode. In the drawings, reference numeral 63 represents a microphone for transforming the sound signal intended for being recorded to an electric signal. Numeral 64 represents an amplifier for amplifying the signal from the microphone 63. Numeral 65 represents a coupling capacitor which is connected between the output side of the amplifier 64 and the luminescent diode 54. This arrangement functions so that, as a sound signal is applied via the amplifier and the coupling capacitor, the luminance of the luminescent diode can be increased or decreased in proportion to the signal voltage from the microphone, with the DC current passing through the luminescent diode being used as a biasing current.

Figure 9:
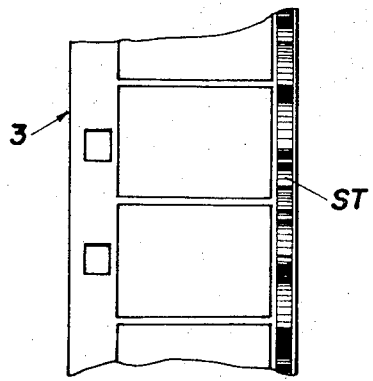
FIG. 9 is a fragmentary plan view, in a diagrammatic representation, of a portion of a motion picture film exposed by the use of the cine-camera of the invention and then developed.

Through the aforesaid optical sound-recording head, a sound track is imprinted, by exposure, onto the film. This sound track is developed simultaneously with the positive images of the objects to be photographed which are carried on the film strips, as this film is developed. FIG. 9 diagrammatically shows this state of the sound track formed on the film. It should be understood that this track of sound is such that, in those regions thereof where the input signal at the time of optical soundrecording is nil, the track has such a density as will not cause any change in the photoelectric cell at the time of reproduction of the sound, meaning that there will be produced no sound. It should be understood further that the distance between each streak, or the image of beam from the luminescent diode, which is formed on the sound track changes with the frequency of the input signal, and also that the density of the streaks changes with the magnitude of the input signal. Therefore, the maximum frequency of the input signal which is permissible for sound-recording is limited by the breadthwise dimension of the slit used. Theoretically, however, a frequency up to 10000 Hz may be employed for the ordinary 8 mm cine films. This value is subjected to restrictions by various factors. As a result of a simple experiment, however, the inventors have succeeded in accomplishing sound-recording with a frequency up to 3000 Hz by the use of a slit formed in the mask of the soundrecording head and having a breadth of five one-hundredths mm. This value may be enhanced further by elevating the precision of the respective parts of the camera mechanisms.

In the drive circuit of the luminescent diode shown in FIG. 12, there is performed temperature compensation of the luminescent diode. A luminescent diode in general, like other semi-conductor devices, is susceptible of undergoing a change in its resistance value in accordance with the temperature applied. Accordingly, the luminance of the diode can change easily in accordance with the change in the temperature. For this reason, a thermistor 66 is connected in series to the luminescent diode 54 in this circuit. This thermistor 66 is selected so that, in case the luminescent diode employed is of the type that its luminance increases with the elevation of the temperature, the thermistor 66 is of a positive resistance temperature coefficient, whereas in case the luminescent diode is of the type that its luminance decreases with the elevation of the temperature, the thermistor employed is of the type having a negative resistance temperature coefficient. It should be understood that the values of these resistance temperature coefficients are such that they are within the range capable of compensating for the increase and decrease in the luminance of the diode. The thermistor desirably is arranged close to the luminescent diode so that the thermistor may be able to have a temperature which is the same as that of the luminescent diode.

The drive circuit for the luminescent diode shown in FIG. 13 is arranged so that the input is divided in use. For this purpose, a bypass capacitor 67 is connected. In this example, like that shown in the circuit of FIG. 12, a thermistor 66 is provided to effect temperature compensation of the diode 54.

Figure 14:
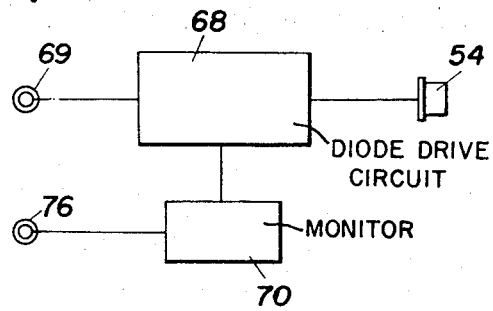
FIG. 14, 15 and 16 are diagrammatic explanatory illustrations, in block style, showing some examples of the constructions of sound-recording amplifier containing the aforesaid drive circuit.
Figure 15:
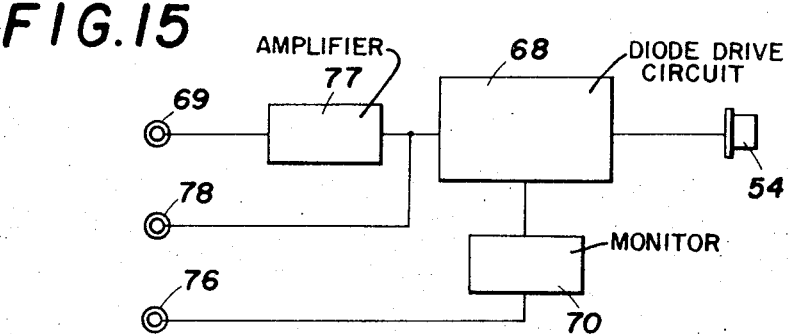
Figure 16:
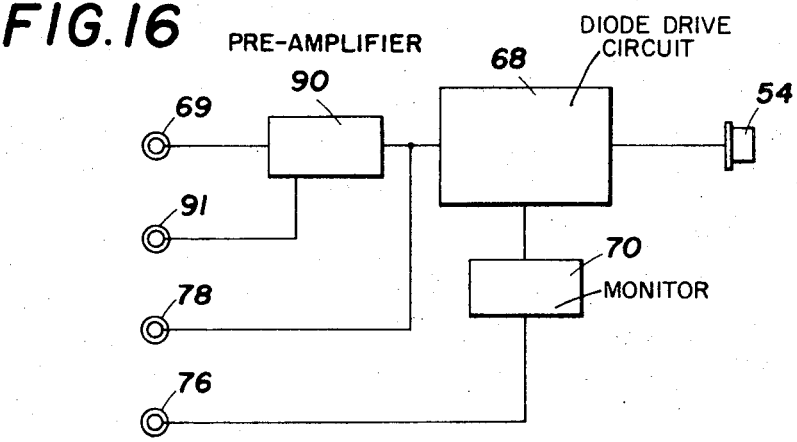

The sound-recording amplifier including the drive circuit of the luminescent diode may assume various kinds of arrangements as shown by block diagrams in FIGS. 14 through 16.

The amplifier shown in FIG. 14 is provided with a drive circuit 68 for the diode 54 and also with a circuit 70 for a monitor. This amplifier is of the arrangement that the output from the microphone amplifier or the tape recorder is applied to the jack 69 which is fixed to the casing 1, and that monitoring may be performed by means of the ear-phone which is connected to the jack 76 which is also fixed to the casing 1.

FIG. 15 shows an amplifier which is suitable for the practice of the present invention. This amplifier is of the arrangement including an amplifier circuit 77 of the output of the microphone, a drive circuit for the diode 54 and a monitoring circuit 70. Since an amplifier circuit of the microphone output is housed within the camera casing as shown, the entire device is obtained as one which is superior in operability in view of the fact that a sound-recording can be accomplished by merely inserting the microphone directly into the jack 69. Furthermore, the output from a tape recorder or the like can be recorded at the same time through the jack 78. The condition of the recording of these two kinds of outputs can be confirmed through the ear-piece from the monitoring jack 76.

Figure 17:
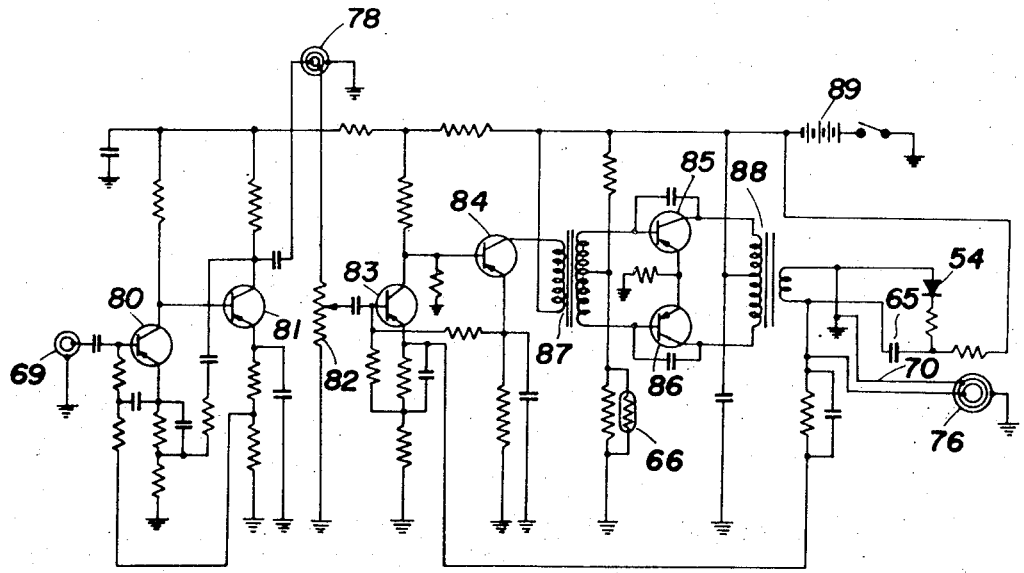
FIG. 17 is an electric circuitry, in a more concrete style, of the sound-recording amplifier shown in FIG. 15.

FIG. 17 shows a concrete example of such a circuit stated above. In this circuitry, the input voltage of the microphone from the jack 69 is amplified and equalized by the circuit which is formed with transistors 80 and 81. Therefrom the resulting input voltage is passed through a variable resistor 82 and supplied to the drive circuit. Also, arrangement is provided so that in the said variable resistor 82, the signal from a tape recorder or the like which is transmitted through the jack 78 is superposed onto the signal transmitted from the said microphone. The drive circuit, on the other hand, is comprised of a voltage amplifying stage which is formed with transistors 83 and 84, and of a power amplifying stage which is composed of transistors 85 and 86. The input signal which has been amplified of its voltage by the transistors 83 and 84 is then subjected to impedance matching by a transformer 87, followed by power amplification which is performed by the transistors 85 and 86. The luminescent diode 54 is connected to the secondary side of the output transformer 88 of the said drive circuit. Onto the DC bias current which flows through this luminescent diode 54 is superposed a signal current which has been cut off of its DC component by the capacitor 65, so that the luminance of the diode 54 is caused to change in accordance with the said magnitude of the signal current. Monitoring is effected through the jack 76 which is connected in parallel with the diode 54. A thermistor 66 which is connected to the secondary side of the transformer 87 performs temperature compensation of the luminescent diode 54. Though not shown, the said amplifier is arranged on a base board having a printed circuit formed thereon and is accomodated on the reverse side of the base plate 19. The amplifier is connected to a power source, i.e., a battery 89, which is provided therebelow. This battery serves also as the power source for the motor 5.

The amplifier means shown in FIG. 16 has, incorporated therein, a pre-amplifier 90 having an equalizer or an amplifying circuit for a microphone, phono-pickup, a tape-recorder or an FM receiver so that it can be adapted to many more inputs. For this purpose, it is arranged so that two microphones may be used at the same time through two jacks 69 and 91, or that simultaneous recording of various different sound sources may be accomplished such as the recording of voice through the jack 69, jointly with the recording of sound effects through the jack 91 connected directly to a disk record player and with the recording of background music which is supplied through the jack 78. It should be noted that the jack 69 and jack 91 may be used either singly or jointly by the manipulation of the changeover switch provided within the amplifier 90.

We claim:

1. A cartridge type cine-camera with an optical simultaneous sound-recording device comprising:

a camera housing having a compartment for receiving a film cartridge, driving means mounted on said housing for rotating at least one film reel of said cartridge;

film feeding means comprising a film drawing-out sprocket and a film taking-in sprocket, said two sprockets being arranged adjacent said cartridge and being driven coercively for feeding the film wound around the said reel and for forming a loop of the said film and means for maintaining the length of the said loop constant;

film exposing means provided within the said loop and including a lens system for focusing the image of the object to be photographed onto the film, a sector vane, a film feeding pawl and a film pressing plate;

film speed stabilizing means provided within the said loop for feeding at a constant speed that portion of the film which has passed the film exposing means;

optical sound-recording head means having a luminescent diode serving as a luminescing source, and facing the said film speed stabilizing means, and amplifier means for the said diode for controlling the luminance of the said diode in accordance with the sound signal current applied to the amplifier means.

2. A cine-camera according to claim 1, in which the said film speed stabilizing means comprises a stabilizing roller which is given a sufficient inertia by a fly wheel, a rotatable control lever adapted to be rendered to a first position and a second position, a guide roller for applying the film sufficiently onto the said film speed stabilizing roller in the said first position of the said control lever, a film guide roller positioned above the said control lever for being positioned close to both of the said two sprockets whenever the said control lever is in its first position, a tension roller for applying a tension to the film in the first position of the said control lever, a lever having at one end thereof a capstan roller adapted to be brought into pressure contact with the said film speed stabilizing roller in the first position of the said control lever, and a holder engaged by the said lever and having a film pressing plate intended for positioning the film at a focusing point of the lens system in the first position of the said control lever, whereby in the second position of the said control lever, the guide roller, the capstan roller, the tension roller and the said pressing plate are released from their cocked state to facilitate the loading of the film on the camera.

3. A cine-camera according to claim 1, in which the camera further comprises means for releasing the film pressing plate of the said film cartridge, said means comprising a window formed through a partition wall constituting said film-cartridge compartment and arranged to be aligned with the opening of the said cartridge when the latter is loaded on the camera, and pawls extending from the said window of the partition wall towards the opening of the said cartridge loaded within the said compartment, whereby the said film pressing plate of the cartridge is pushed by the said pawls at the time the cartridge is loaded on the camera.

4. A cine-camera according to claim 1, in which one of the said two sprockets comprises a sprocket wheel engaged by a pin fixed to a base plate of the camera, a sleeve mounted on the said pin in adjacent alignment with the said sprocket wheel, a clutch means mounted on the said sleeve and having two members, a coil spring applied between one of the said clutch members and the said sprocket wheel, a stopper for limiting the movement of the other of the clutch members on the said sleeve, and pawls formed on the respective clutch members so as to mesh with each other to rotate unidirectionally.

5. A cine-camera according to claim 1, in which the said amplifier for driving the said luminescent diode to perform optical sound-recording has a driving circuit comprising a load resistor connected in series to the said luminescent diode, a DC power source connected to both the said diode and the said load resistor, and a capacitor for applying AC input signal current to the said diode.

6. A cine-camera according to claim 1, in which the said optical sound-recording head means comprises a cylindrical body, a luminescent diode fixed to one end of the said body in such a way that its luminescing face is directed to face the said stabilizing roller, a first mask having a narrow slit and being provided in the immediate foreground of the said diode, a lens system fixed at a predetermined position within the said body for focusing the image of light of said diode onto the film located on the said stabilizing roller, and a second mask provided at that end of the body located farther from the said one end to which the diode is fixed, said first mask serving to limit the breadth of the said image of light of the diode and said second mask serving to limit the lingitudinal dimension of this image.

7. A cine-camera according to claim 1, in which the said optical sound-recording head means comprises a cylindrical casing, a luminescent diode fixed to one end of the said casing in such a way that its luminescing face is directed to face the said stabilizing roller, a mask having a sufficiently narrow slit and being positioned in the immediate foreground of the diode, and at least two lenses for focusing the image of the luminescent region of the diode onto the film, the said lenses being of radii and thicknesses which, respectively are different from each other and being positioned to cross each other, whereby one of the lenses serving to limit the breadth of the said image, while the other of the lenses serving to limit the longitudinal dimension of this image.

* * * * *